April 22, 1930.   L. O. GAGNON   1,755,292
METHOD OF MAKING OPHTHALMIC MOUNTINGS
Original Filed April 15, 1926
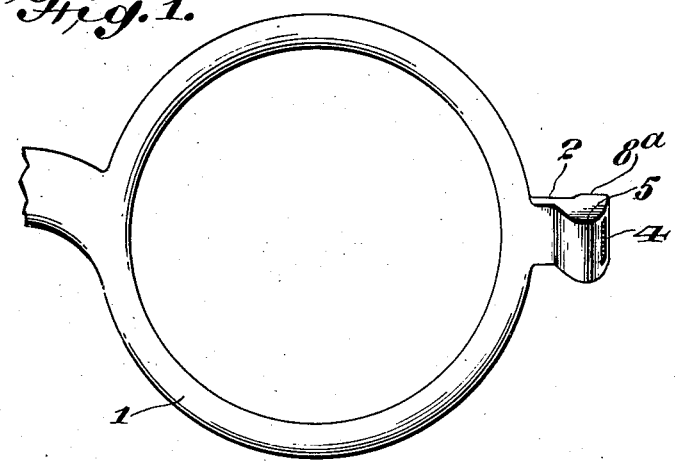
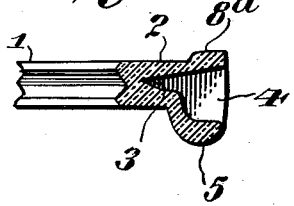
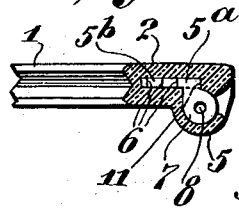
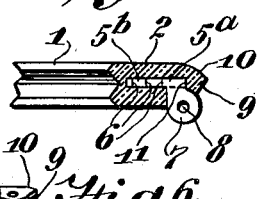
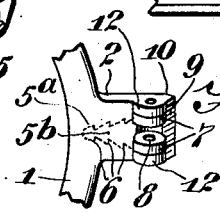
INVENTOR
Leo O. Gagnon
BY Cyrus N. Anderson
ATTORNEY Patented Apr. 22, 1930

1,755,292

UNITED STATES PATENT OFFICE

LEO O. GAGNON, OF NEWARK, NEW JERSEY, ASSIGNOR, BY MESNE ASSIGNMENTS, TO CONTINENTAL OPTICAL MANUFACTURING COMPANY, OF INDIANAPOLIS, INDIANA, A CORPORATION OF INDIANA

METHOD OF MAKING OPHTHALMIC MOUNTINGS

Original application filed April 15, 1926, Serial No. 102,162. Divided and this application filed June 11, 1927. Serial No. 198,263.

This invention relates to ophthalmic mountings, particularly spectacle frames consisting of zylonite or any other suitable, similar or equivalent material. The invention relates especially to improvements in the method of securing hinge or pivot members to the opposite ends of the lens holding part of the frame and to the front ends of the temple bars of such frame.

It is an object of the invention to provide a method involving simple and efficient operations whereby metallic hinge or pivot members may be secured to the opposite ends of the lens holding element or part of the frame and to the front ends of the temple bars in a manner such that a maximum of concealment may be effected and also in a manner such that a maximum of strength may be obtained in the completed structure.

The invention comprehends the method which is of the character heretofore indicated but it will be understood that alterations or changes in the sequence of the steps employed in carrying out or practising the method may be made within the scope of the claims without departing from the principle involved in the invention.

In order that the method constituting the invention may be readily and more clearly understood and its practical advantages fully appreciated, reference may be had to the accompanying drawing in which I have illustrated the steps involved in the carrying out of the said invention.

In the drawing:

Fig. 1 is a view in rear elevation of approximately one-half portion of the lens holding element or frame with the temple lug thereof only partly completed;

Fig. 2 is a view in horizontal transverse section through a lens holding element or rim and a lug only partly completed as shown in Fig. 1;

Fig. 3 is a view in rear elevation of a metal pivot member adapted to be mounted in the said temple lug;

Fig. 4 is a view in horizontal transverse section taken through the said lug and the adjoining portion of the lens holding rim after the mounting therein of the metal pivot member shown in Fig. 3;

Fig. 5 is a view similar to that shown in Fig. 4 but showing portions of the lug cut away so as to expose portions of the pivot member;

Fig. 6 is a view in rear elevation of the portion of the frame shown in Fig. 5;

Fig. 7 is a longitudinal sectional view of the front end portion of a temple bar provided with a socket adapted to receive a metal pivot member;

Fig. 8 is a view of the front end of said bar;

Fig. 9 is a view in inside elevation of the front end portion thereof with the metal pivot member mounted in the socket provided therefor;

Fig. 10 is a view in side elevation of the portion shown in Fig. 8;

Fig. 11 is a view in side elevation of the front end portion of a temple bar showing the first step in a modified method which may be employed in securing the metal hinge member to the bar;

Fig. 12 is a view in side elevation indicating a subsequent step in the said modified method;

Fig. 13 is a view in longitudinal section showing the front end portion of a temple bar made in accordance with the method indicated in Figs. 11 and 12; and Fig. 14 is a view in horizontal section taken through a temple lug and the adjoining portion of the lens holding rim and also taken through an adjoining portion of a temple bar hinged to the said lug, the said bar being shown in open position.

Upon reference to the drawing it will be noted that I have illustrated approximately one-half portion only of the lens holding part of the frame for the purpose of illustrating the method employed by me in the securing of metal hinge or pivot members or elements to the opposite ends of the lens holding part of the frame and to the forward or front ends of the temple bars thereof.

Exactly the same construction of hinge connection is employed at the opposite ends of the frame; hence in the description of the invention one end only of the frame or mounting will be referred to and the singular number will be employed.

As already indicated, the mounting comprises zylonite or its equivalent.

In the carrying out of the method constituting my invention, the lens holding portion is first produced comprising rims 1, only one of which is shown in the drawing, which portion is provided at its opposite ends with lugs or projections. As illustrated in Fig. 1, I have shown a lug 2 in process of formation to receive a metal hinge element to be inserted in a manner which will hereinafter be described. The lens holding portion of the frame having been formed or produced as stated, the portion thereof including a lug 2 is heated in order to soften the same. Thereafter an opening is formed in the said lug extending from the outer end thereof inwardly, which opening terminates short of the inner side of the lens holding rim 1 as is clearly shown. The inner portion of the said opening is tapered as indicated at 3 and the outer end portion thereof is enlarged as indicated at 4, the greater portion of the said enlargement being provided upon the rear side of the said lug as indicated at 5. The opening in the lug 2 having been provided as indicated in Fig. 2 of the drawing, the metal hinge member 5ª is then inserted. The said member comprises a flat tapered portion 5ᵇ, the opposite edges of which are serrated or notched to form teeth 6 as shown and the outer, wider end thereof terminates in laterally extending projections forming pivot ears 7 which are provided with pivot holes 8 extending therethrough. The size of the portion 3 of the opening in lug 2 is such that some force is required to insert the tapered portion 5ᵇ of the hinge or pivot member 5ª thereinto. Preferably the hinge or pivot member should be heated before it is inserted into the opening in the lug 2 in order that the material of the lug may more readily adapt itself to the inserted portion. The ears 7 of the hinge or pivot member 5ª occupy the outer enlarged portion 4 of the opening in the lug 2 as will be apparent from an inspection of Fig. 4 of the drawing.

After the metal hinge member 5ª has been placed in position within the opening in the lug 2 and while the said lug is at a temperature to render the same more or less plastic, it is placed in a suitable press or die and pressed tightly about the said hinge or pivot member so as to flatten the enlargement 8ª at the front side of the lug 2, produced by the enlarging of the outer end of the opening therein, and cause the material of the said lug including the rear portion thereof at 5 to hug closely against the pivot member 5ª as is clearly illustrated in Fig. 4 of the drawing. It will be seen that as a result of the compressive pressure to which the lug has been subjected the front portion thereof has been rendered smooth by the elimination of the projection 8ª and that the rearwardly projecting portion at 5 has been reduced in thickness and bent around the inner and rear edge portions of the ears 7. After the enlarged outer end portion of the lug 2 has been formed about the hinge or pivot member 5ª as shown in Fig. 4, the outer end portions thereof are cut away so as to provide a shoulder 9 and so also as to bevel or taper the front portion of the lug as indicated at 10. It will be noted that as a result of the compression to which the said lug is subjected, a shoulder 11 is formed against the outer end of the portion 5ᵇ of the hinge or pivot member which constitutes an additional means for preventing removal of the said hinge member from the lug.

The material of the rear projecting portion 5 after compression as above described is cut away so as to expose the rear edge portions of the ears 7 and to provide outer coverings 12 therefor, which coverings are of identically the same shape as the ears themselves. The material intermediate the said ears 12 is cut away in order that the pivot ear 13 of the hinge member 14 at the front end of the temple bar may be inserted into the space between the ear 7.

The hinge member 14 comprises the tongue or prong portion 15 having projections or spurs 16 upon one edge thereof as shown and the pivot ear portion 13.

The said hinge member 14 is secured in the front end portion of the temple bar 17 in a manner similar to that in which the hinge or pivot member 5ª is secured in the lug 2.

According to the method as illustrated in Figs. 7 to 10 inclusive the front end portion of the said temple bar is first heated to render the same more or less plastic. Thereafter an opening is formed therein which extends longitudinally thereof. The said opening comprises an inner reduced portion as indicated at 20 and an outer enlarged portion as indicated at 21. The inner portion of the material of the bar in line with the outer end portion of the opening is cut away as indicated at 22 so as to provide space for the ear 13 of the metallic hinge member 14 which is to be secured in the forward end of the said bar.

In producing the opening with the enlarged outer end portion 21 a projection 23 is formed upon the outer side of the front end portion of the temple bar. When the portion 15 of the hinge member 14 is inserted into the opening 20 it preferably is at a temperature to melt or soften the material of the bar so that it will flow into close engagement therewith and with the projections or spurs 16. Thereafter the front end of the temple bar is placed in a press or die and subjected to pressure to flatten the projection 23 and cause the material of the bar to hug closely against the hinge member. A portion of the material at the front end of the temple bar is caused to extend partially around the circumference of the circular pivot eye 13 and a shoulder at 25 serves as an additional means to prevent the hinge member 14 from being disconnected from the temple bar. Thereafter the front end of the temple bar is cut away so as to form the surface 26 constituting a shoulder which is adapted to co-act with the shoulder 9 upon the temple lug of the lens holding part of the frame. Circular or arc shaped depressions are formed upon the inner side of the temple bar upon opposite sides of the circular ear or projection 13, as shown at 27, in which the ears 7 of the hinge or pivot member 5ª are located when the temple bar is connected to the temple lug by a pivot pin 28.

In Figs. 11, 12 and 13 of the drawing a somewhat different method of operation is employed for securing the pivot or hinge member 14 in the front end of the temple bar. In the method employed in Figs. 11 to 13 of the drawing a notch 30 of arcuate shape is provided in the inner side of the temple bar a short distance from the front end thereof. The front end portion of the temple bar is then heated so as to render the same more or less plastic, after which the forward end portion is bent away from the said notch as indicated at 31. A hole or opening 32 is formed by drilling or otherwise in the forward end portion of the said bar. The forward end of said hole terminates substantially at the bottom of the notch 30. The hinge member 14 is then inserted into the opening 32 as indicated in Fig. 12, after which and while the front end portion of the temple bar is at a temperature such as to render the same pliable the outwardly bent forward end portion 31 is returned to more or less normal position in alinement with the main body portion of the temple bar. The said forward end portion is placed in a die or press and subjected to pressure so as to cause portions thereof to extend part way around the circular hinge or pivot eye 13 and to form a shoulder in front of the front end of the portion 15 of the hinge or pivot member 14. Thereafter the front end portion of the temple bar is cut away so as to form the shoulder surface 26 and also so as to slightly taper or bevel the outer side thereof as indicated at 33. It will be noted that the outer forward end portion of the temple bar shown in Fig. 10 is likewise tapered or beveled. The resulting construction of the temple bar is the same whether one method or the other as above described be employed.

It will be seen that by my invention I am enabled to provide a spectacle frame comprising zylonite or an equivalent material in which the metal hinge or pivot members of the construction are almost completely hidden and whereby also a construction which is strong and rugged in character is produced.

By the term "zylonite" employed in the specification and claims I intend to refer to and include not only the material known generally as zylonite in this art but also celluloid or any other material of a similar or a suitable character adapted for use in the manufacture of ophthalmic mountings.

The subject matter of this application is a division of the subject matter disclosed in my application for Letters Patent filed April 15, 1926, Serial Number 102,162.

Having thus described my invention, what I claim and desire to secure by Letters Patent is:

1. The method of securing a hinge member within an end portion of a zylonite ophthalmic mounting, which comprises the formation of a longitudinally extending opening therein with an expanded outer end and simultaneously forming oppositely disposed projections exteriorly of the said end portion, placing a hinge member in said opening, thereafter compressing the said outer end portion to flatten one of the said projections and cause the material of the said end portion to hug closely the said member, and thereafter removing portions of the material of said end portion to form ears corresponding to and covering the outer sides of the hinge ears of said hinge member.

2. The method of securing a hinge member within an end portion of a zylonite ophthalmic mounting, which comprises the formation of a longitudinally extending opening therein, expanding the outer end of said opening and forming oppositely disposed projections exteriorly of the said end portion, placing a hinge member in said opening, thereafter compressing the said outer end portion to flatten one of the said projections and cause the material of said end portion to hug closely the said hinge member, and thereafter removing portions of the material of said end portion to form ears corresponding to and overlying the outer sides of the hinge ears of the said hinge member.

3. The method of securing a metal hinge member having laterally extending hinge ears at its outer end within a temple lug at an end of a spectacle frame consisting of zylonite, which comprises the formation of a longitudinally extending opening in the said lug, expanding the outer end of said opening from front to rear and simultaneously forming exterior front and rear projections, placing a hinge member within the said opening with the hinge ears thereof projecting toward the rear, thereafter compressing the said temple lug to flatten the projection upon the front side of the said lug to cause the material of the said lug to hug closely against all sides of the said hinge member, and thereafter removing a portion of the material of the said lug at the outer end thereof and also a portion of the rearwardly extending projection to form ears overlying the outer sides of the said hinge ears and to expose portions of the peripheries of said ears.

4. The method of making articles of the class described which comprises the formation of a longitudinally extending opening in the forward end portion of a non-metallic member, inserting a hinge member in said opening, compressing the material of said member around the said hinge member and thereafter removing portions of said material to expose peripheral portions of the ears formed upon the said hinge member.

5. The method of making articles of the class described which comprises the formation of an opening in the forward end portion of a non-metallic member, inserting a heated metallic hinge member in said opening, compressing the material of said member while rendered plastic by the heat of said hinge member around the latter and around the forward end thereof, and thereafter removing portions of the material surrounding the ears formed on said hinge member to expose peripheral portions of the said ears.

6. The method of making articles of the class described which comprises forming a longitudinal opening with an expanded outer end in the forward end portion of a non-metallic member, inserting a metallic hinge member in the said opening, thereafter compressing the material of the said non-metallic member to completely surround the said hinge member, and thereafter removing portions of the said material to expose peripheral portions of the ears of said hinge member and to permit a complementary hinge member to be engaged with the said ears.

7. The method of making articles of the class described which comprises the formation of an opening in the forward end portion of a non-metallic member, inserting a heated metallic hinge member in said opening, compressing the material of said member while rendered plastic by the heat of said hinge member around the latter, and thereafter removing portions of the material surrounding said hinge member to expose the peripheral edges of the ears formed on the said hinge member and to form ears corresponding to and covering the outer sides of the hinge ears of the said hinge member.

In testimony that I claim the foregoing as my invention, I have hereunto signed my name this 9th day of June, A. D., 1927.

LEO O. GAGNON.